United States Patent
Stafford et al.

[11] Patent Number: 5,786,107
[45] Date of Patent: Jul. 28, 1998

[54] BATTERY SYSTEM WITH A HIGH-THERMAL-CONDUCTIVITY INTEGRAL STRUCTURAL SUPPORT

[75] Inventors: John P. Stafford, Yorba Linda; Walter Rex Oswald, Redondo Beach; Susan K. Ferer, Rancho Palos Verde; Steven J. Stadnick, Lakewood, all of Calif.

[73] Assignee: Hughes Electronics, Los Angeles, Calif.

[21] Appl. No.: 644,030

[22] Filed: May 9, 1996

[51] Int. Cl.$^6$ ........................................... H01M 2/02
[52] U.S. Cl. ............................... 429/163; 429/100
[58] Field of Search ................... 429/100, 163, 429/167, 164

[56] References Cited

U.S. PATENT DOCUMENTS

| | | |
|---|---|---|
| 3,669,744 | 6/1972 | Tsenter et al. |
| 4,000,350 | 12/1976 | Wittmann |
| 4,250,235 | 2/1981 | Dupont et al. |
| 4,262,061 | 4/1981 | Rogers |
| 4,283,844 | 8/1981 | Milden et al. |
| 4,369,212 | 1/1983 | Rogers et al. |
| 4,683,178 | 7/1987 | Stadnick et al. |
| 5,202,200 | 4/1993 | McMillan et al. ............ 429/187 |
| 5,310,141 | 5/1994 | Homer et al. |
| 5,591,540 | 1/1997 | Louie et al. ............ 429/163 |

FOREIGN PATENT DOCUMENTS

| | | |
|---|---|---|
| 0647 559 A1 | 4/1995 | European Pat. Off. |
| 0704 919 A | 4/1996 | European Pat. Off. |
| 2 694 958 | 2/1994 | France |
| 2 086 645 | 5/1982 | United Kingdom |

OTHER PUBLICATIONS

Peck, S. O., et al.; "High Thermal Conductivity Graphite in Space Applications;" *American Inst. of Aeronautics and Astronautics*; Preprint AIAA-95-1474-CP; pp. 2931-2938; (1995) (month n/a).

V. C. Mueller, Nickel-Hydrogen Battery Integration Study for the Multimission Modular Spacecraft, Proceedings of the 15th Intersociety Energy Conversion Engineering Conference, vol. 3, No. 3, 18 Aug. 1980, pp. 1901-1907.

*Primary Examiner*—M. Nuzzolillo
*Attorney, Agent, or Firm*—Elizabeth E. Leitereg; Terje Gudmestad; Wanda K. Denson-Low

[57] ABSTRACT

A battery system includes a battery cell having a cylindrical battery cell housing and a housing support external to the battery cell housing. The housing support is formed of an electrical insulator layer contacting the cylindrical external surface of the battery cell housing, and a heat conductor formed of heat-conducting fibers overlying and contacting the electrical insulator layer and aligned generally parallel to the cylindrical axis of the battery cell housing. The heat-conducting fibers are made of high-thermal-conductivity graphite and have a sink end. A fiber-reinforced composite structural support layer is applied overlying the heat-conducting fibers to force the electrical insulator layer into contact with the battery cell housing without the presence of an adhesive between the electrical insulator and the battery cell housing. A thermal sink is in thermal contact with the sink ends of the plurality of heat-conducting fibers at a first end of the cylindrical battery cell housing. A structural base joined to the structural support layer is positioned at a second end of the cylindrical battery cell housing.

20 Claims, 4 Drawing Sheets

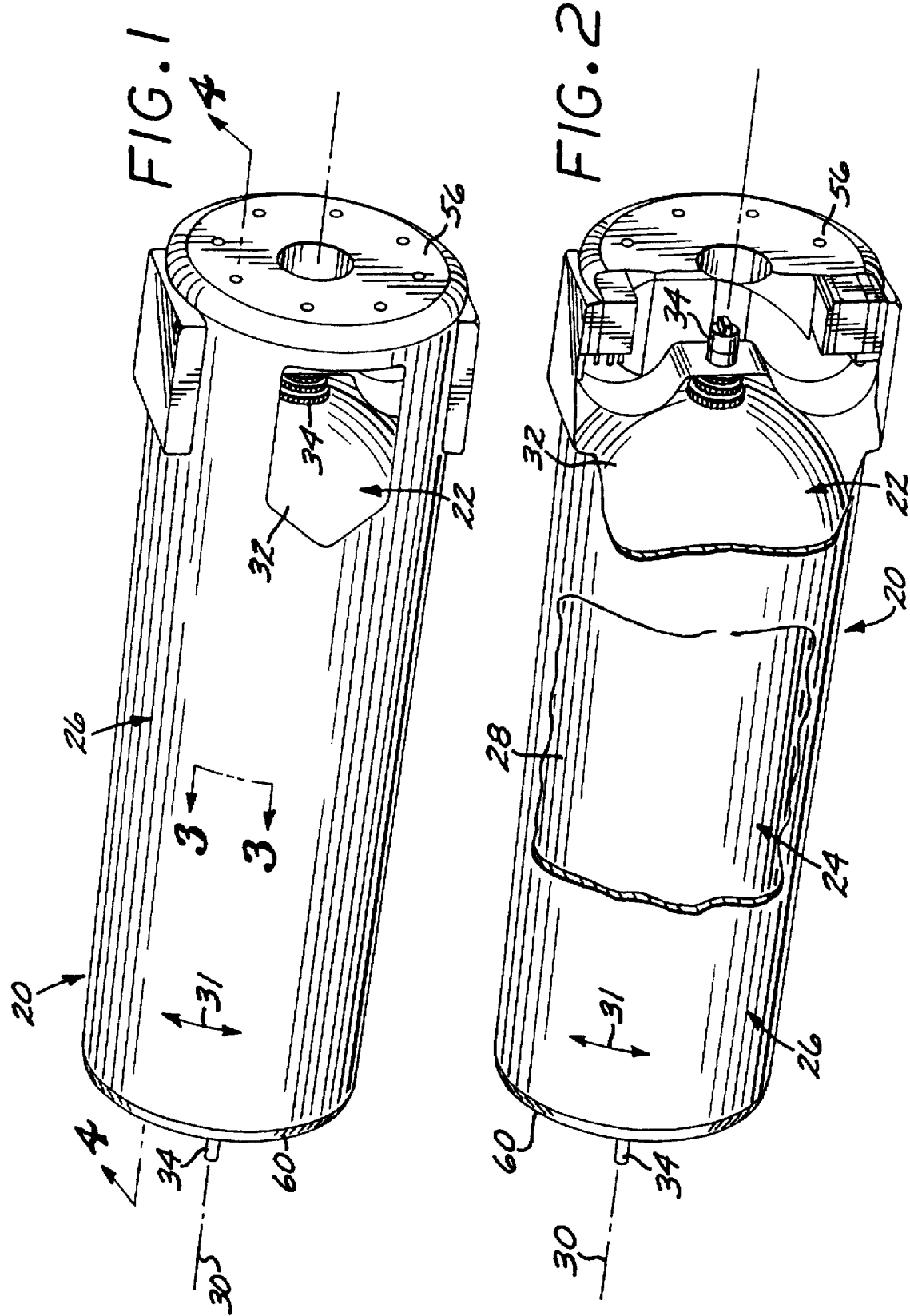

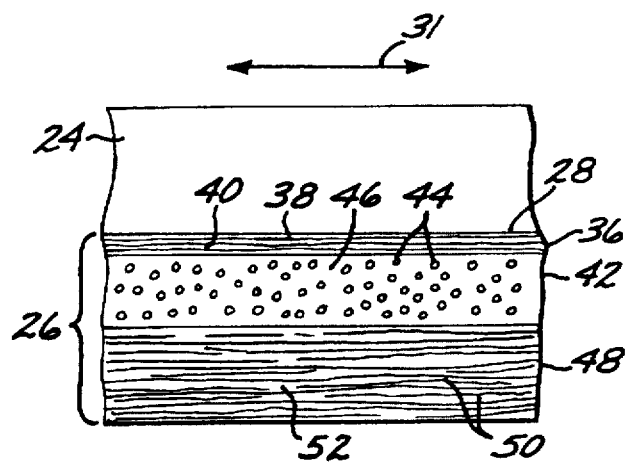
FIG. 3
FIG. 4
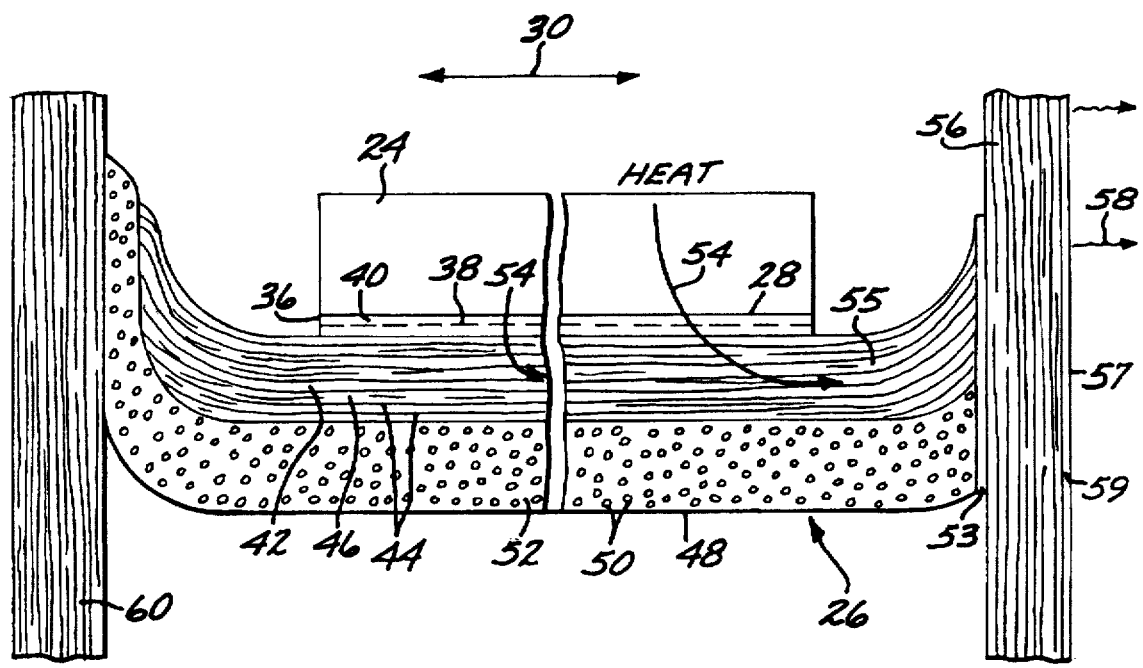

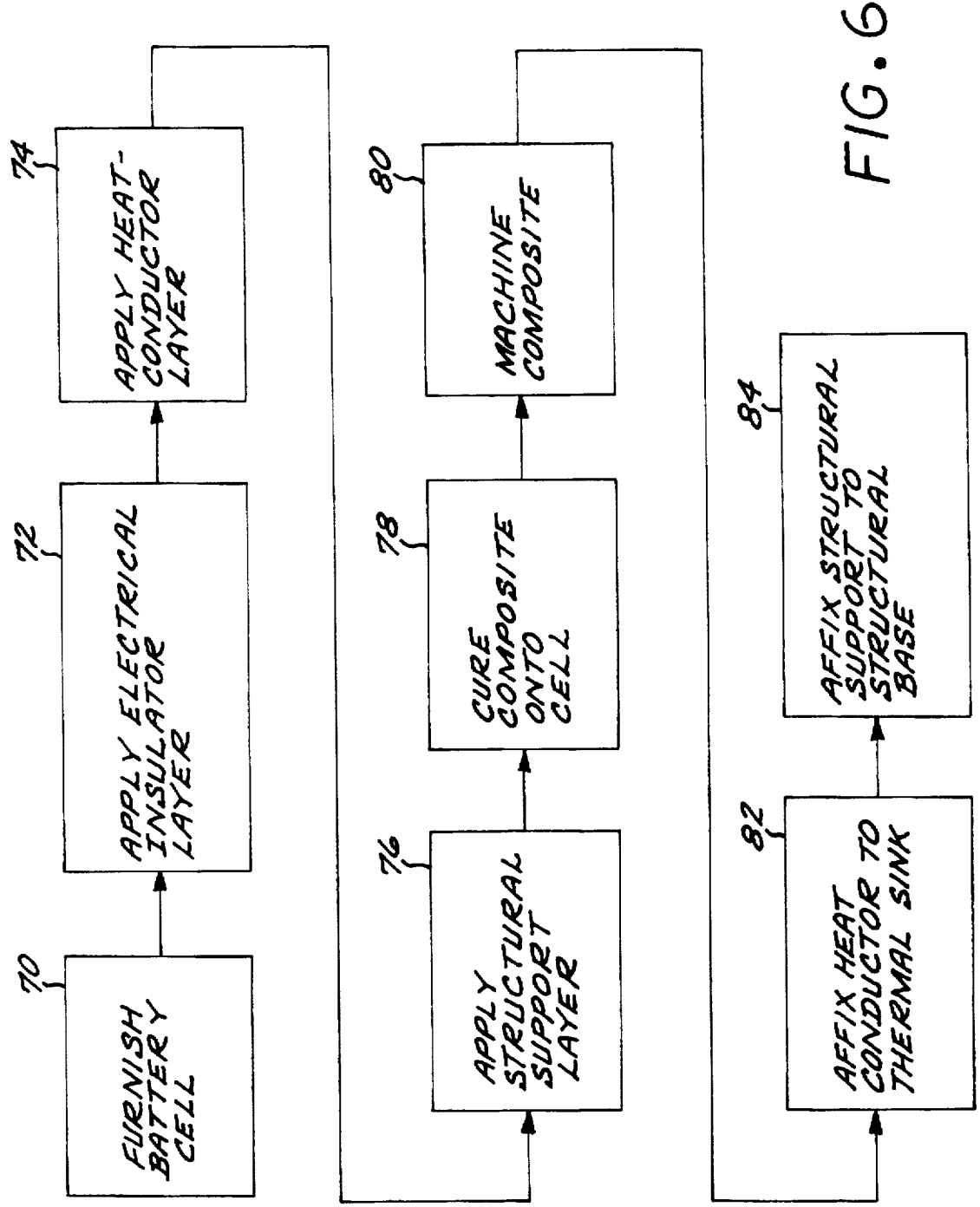

BATTERY SYSTEM WITH A HIGH-THERMAL-CONDUCTIVITY INTEGRAL STRUCTURAL SUPPORT

BACKGROUND OF THE INVENTION

This invention relates to battery systems of the type used in spacecraft, and, more particularly, to a cylindrical battery cell and its thermal/structural support.

Spacecraft such as communications and other types of satellites carry onboard power-generation systems and batteries to store the generated power for peak-consumption situations and for use when the power-generation system has reduced power output. For example, an earth-orbiting communications satellite with solar cells for the production of electricity has batteries to provide power when the solar cells are in shade or oriented in relation to the sun in such as manner that the power output is below that required to operate the satellite.

The batteries, which are made of a number of individual battery cells, are part of a battery system which includes structural support and thermal management for the batteries, and an electrical control and distribution system. The present invention deals with the structural support and thermal management of the batteries. Although the batteries are weightless in space, they must be properly supported for the loadings and vibrations that are experienced during the testing, transportation, and launching, and the internal pressure produced within the battery cell during operation, which must be structurally contained. When the batteries are used in space, the chemical reactions occurring during the charging/discharging cycle produce heat. The batteries must be supported in such a manner that the batteries are not damaged by structural loadings and vibrations, and also such that the internal heat produced within the battery cells is conducted away to a heat sink so that the cells are not heated above their operating limits.

Several approaches are known for the structural support and thermal management of the batteries. Most commonly, the battery cells are bonded to an aluminum thermal flange that is connected to the spacecraft radiator, which serves as the heat sink. The cells and thermal flanges are mechanically supported on aluminum shelves. In recent developments, composite materials have been used to form the thermal flanges. Even though aluminum is a low-density metal, the fabrication of the thermal flanges from composite materials reduces the weight of the structure even further. The weight of the spacecraft is a critical concern, as the cost of launching the spacecraft runs to the thousands of dollars per pound. The composite approaches previously proposed reduce the weight, but do not achieve a minimal weight by integrating thermal and structural components.

There is a need for a battery system having satisfactory structural support for the battery cell and also good heat removal. Such a battery system has direct application in spacecraft, but also in other battery applications as well.

SUMMARY OF THE INVENTION

The present invention provides a battery system utilizing a composite battery cell housing support that achieves excellent structural support of the battery cell and also high heat-removal efficiency from the battery cell, and with reduced weight as compared with prior approaches. The battery cell housing support is a structural member and also aids in containing the pressure within the battery cell housing, so that the wall thickness and thence the weight of the battery cell may be reduced. The battery cell housing, in turn, serves as a structural component as well as the container for the energy storage active elements, so that the weight of the housing support can be reduced. Structural support and thermal management parameters are selectable to achieve the optimum respective properties, without resorting to property tradeoffs that result in sub-optimal performance.

In accordance with the invention, a battery system comprises a battery cell having a battery cell housing and a housing support external to the battery cell housing. The housing support includes an electrical insulator layer contacting an external surface of the battery cell housing, preferably with no adhesive between the external surface of the battery cell housing and the electrical insulator layer. (In a preferred embodiment the electrical insulator layer is a fiberglass material formed of glass fibers in an epoxy matrix. By "no adhesive between the external surface of the battery cell housing and the electrical insulator layer" is meant that no additional adhesive, separate from any adhesive-like material that may be part of the electrical insulator layer, is used.) The housing support additionally includes a heat conductor comprising a plurality of heat-conducting fibers contacting the electrical insulator layer. The heat-conducting fibers each have a sink end. A structural support layer overlies the plurality of heat-conducting fibers. The structural support layer is made of a fiber-reinforced composite material. A thermal sink is in thermal contact with the sink ends of the plurality of heat-conducting fibers. Preferably, the thermal sink is located at one end of the battery cell, and a structural base to which the structural support layer is joined is disposed at the other end of the battery cell.

The electrical insulator layer is preferably an electrically insulating composite material such as fiberglass. The heat-conducting fibers are preferably high-thermal-conductivity graphite. These heat-conducting fibers conduct the heat produced in the battery cell to the heat sink. They provide some longitudinal stiffness to the battery system, but are not the principal structural supports. The structural support layer is preferably made of a high-strength graphite-fiber-reinforced polymeric matrix, applied to the external surface by an off-axis winding or layup operation that produces controllable circumferential and axial components to the strength that may be selected for particular applications.

The housing support serves to position and support the battery cell, but it also bears some of the hoop stress loading of the battery cell housing, aiding the battery cell housing to resist the deformation and fracture potentially resulting from the internal pressures generated during the charging portion of the charging/discharging cycle. The wall of the battery cell housing may be made thinner, and thence lighter, than would otherwise be the case, resulting in a significant weight savings for the spacecraft. The battery cell housing also bears some of the structural loading when multiple battery cells are arranged in a pack.

The battery cell housing is preferably in the form of an elongated cylinder with the electrochemical electrodes within the housing. Thus, in one preferred embodiment, a battery system comprises a battery cell having a generally cylindrical battery cell housing with a cylindrical axis and a cylindrical external surface, and a housing support external to the cylindrical external surface of the battery cell housing. The housing support comprises a electrical insulator layer contacting the cylindrical external surface of the battery cell housing, and a heat conductor comprising a plurality of heat-conducting fibers overlying and contacting the electrical insulator layer and aligned generally parallel to the cylindrical axis of the housing. Each of the heat-conducting fibers is made of high-thermal-conductivity graphite and has a sink end thereof. A structural support layer overlies the plurality of heat-conducting fibers and forces the electrical insulator layer into contact with the battery cell housing without the presence of an adhesive between the electrical insulator and the housing. The structural support layer is made of a fiber-reinforced composite material. A thermal sink is in thermal contact with the sink ends of the plurality of heat-conducting fibers at a first end of the battery cell housing. Preferably, a structural base to which the structural support layer is joined is positioned at a second end of the cylindrical housing of the battery cell.

It is not uncommon that a communications satellite will employ a large number of battery cells, typically 24–60 battery cells in current communications satellites, to provide the required battery system output and storage capacity. The multiple battery cells are arranged together in battery packs of convenient size. For example, one satellite system requires 32 battery cells, arranged in four battery packs of eight battery cells each. The present invention may be used with such battery packs of battery cells, to even greater advantage than achieved in conjunction with single battery cells.

In accordance with this aspect of the invention, a battery system comprises a plurality of battery cells, with each of the battery cells having a battery cell housing. A respective housing support is external to and overlies each battery cell housing. Each housing support comprises an electrical insulator layer contacting an external surface of the respective battery cell housing with no adhesive between the external surface of the respective battery cell housing and the electrical insulator layer, and a heat conductor comprising a plurality of heat-conducting fibers contacting the electrical insulator layer, each of the heat-conducting fibers having a sink end thereof. A structural support layer overlies the plurality of heat-conducting fibers in each of the housing supports, with the structural support layer being made of a fiber-reinforced composite material. A thermal sink is in thermal contact with the sink ends of the plurality of heat-conducting fibers of each of the housing supports, and a structural base to which the structural support outer layer of each of the housing supports is joined.

In such a battery pack having a plurality of battery cells, the individual support housings bear some of the hoop stress loadings of their respective battery cell housings in the manner discussed previously, permitting the weight of the battery cell housings to be reduced. Additionally, the battery cell housings and support housings extending between the thermal sink and the structural base impart a rigidity to the structure that resists loads and deformations. Consequently, separate load-bearing supports extending between the thermal sink and the structural base are not required in the overall support structure of the battery pack, permitting the weight of the support structure of the battery pack to be reduced. The use of the composite sleeve-type housings overlying the individual battery cells thereby permits weight reduction of the battery system in two ways: by strengthening the individual battery cells against deformation and failure due to their internal pressure, and by providing the structural connection between the thermal sink and the structural base so that the structural connection otherwise required may be omitted. Stated alternatively, the battery cell housing and the support housing serve as load-bearing components of the structural support system, and the structural support serves to carry some of the internal pressure loading of the battery cell housing. By causing the components to serve such multiple functions yet be separately optimized, the approach of the invention permits a significant weight reduction of the battery pack, without changing the design of the battery cells themselves (except to reduce their wall thicknesses).

The mounting approach of the invention provides great flexibility in selecting the orientation of the battery cells within the battery pack, as well as the interconnect wiring leading between the battery cells. The ability to select these design parameters within the scope of the mounting structure allows the spacecraft designer to control to some extent the dipole moment of the battery pack and thence the dipole moment of the spacecraft.

The battery system of the invention provides a significant improvement in achieving the required structural support and thermal dissipation required in a spacecraft battery system, with reduced weight. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a perspective view of a battery cell and its integral thermal/structural support;

FIG. 2 is a perspective view like that of FIG. 1, with a portion of one end of the thermal/structural support broken away to illustrate the battery cell;

FIG. 3 is an enlarged sectional view of the battery system of FIG. 1, taken along lines 3—3 of FIG. 1;

FIG. 4 is an enlarged sectional view of the battery system of FIG. 1, taken along lines 4—4 of FIG. 1;

FIG. 6 is a process flow diagram of a process for preparing the battery system.

DETAILED DESCRIPTION OF THE INVENTION

Figure 5:
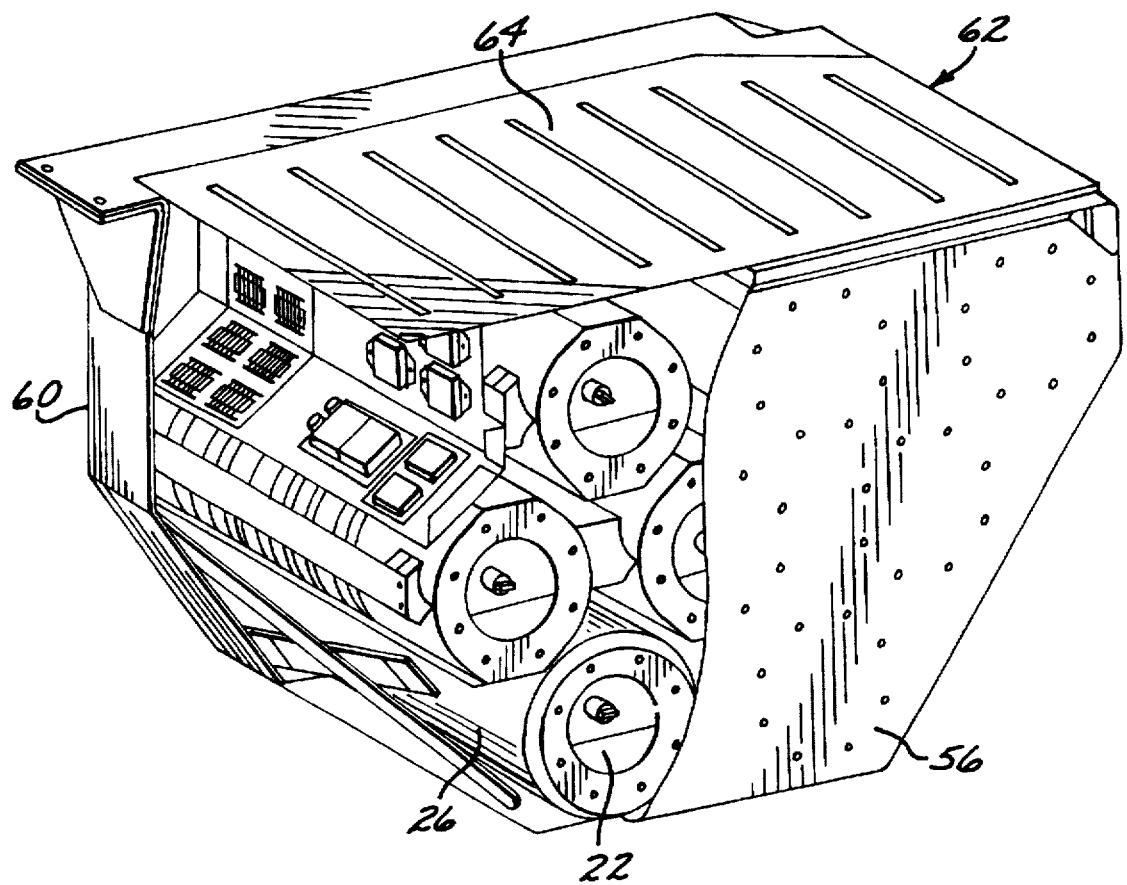
FIG. 5 is a perspective view of a battery pack utilizing multiple battery cells, with a portion of the structural base and the side walls removed to illustrate the interior of the battery system.

FIGS. 1 and 2 illustrate a battery system 20 including a battery cell 22, which is preferably a nickel-hydrogen battery cell. The battery cell 22 has a battery cell housing 24 made of a metal such as the nickel-base alloy NCONEL™, a trade mark of INCO Alloys International, Inc., and a housing support 26 external to the battery cell housing 24. The battery cell housing 24 includes a generally cylindrical surface 28 with a cylindrical axis 30 and an orthogonal circumferential direction 31, and oppositely disposed domed ends 32 joined to the cylindrical surface 28. This cylindrical configuration is preferred, but the present invention is not limited to such a shape and is more broadly applicable. Electrical contacts 34 of opposite polarity extend from the two domed ends 32. The external and internal structures of the battery cell 22 (but not that of the support housing 26) are known in the art and are described, for example, in U.S. Pat. Nos. 4,683,178; 4,369,212; 4,283,844; 4,262,061; 4,250,235; 4,000,350; and 3,669,744, whose disclosures are incorporated by reference. The present invention is not concerned with the internal structural details of the battery cell 22 or its operation.

FIGS. 3 and 4 illustrate sections through the battery system 20, with FIG. 3 taken perpendicular to the cylindrical axis 30 and FIG. 4 taken perpendicular to the circumferential direction 31. FIGS. 3 and 4 are not drawn to scale.

The housing support 26 overlies and contacts the cylindrical surface 28 on the outside of the battery cell 22. Lying immediately adjacent to the cylindrical surface 28 of the battery cell housing 24 is an electrical insulator layer 36. The electrical insulator layer 36 may be omitted in some cases, but its presence is strongly preferred. The electrodes and electrical conductors within the battery cell are isolated from the walls of the battery cell housing 24, but the electrical insulator layer 36 is provided to externally isolate the battery cell housing 24 to prevent the battery cell from shorting during assembly, test, transportation, and launch.

The electrical insulator layer 36 is preferably made of glass fibers 38 embedded in a polymeric matrix 40, termed fiberglass. The glass fibers 38 are not relied upon to impart significant structural strength, but they may be oriented so as to have a component parallel to the circumferential direction 31 to provide a degree of hoop strength to the insulator layer 36. The glass fibers 38 may also be oriented at an angle intermediate between the circumferential direction 31 and the axial direction 30, or even parallel to the axial direction 30. A preferred fiberglass material is an E-glass-based fiberglass, commercially available from J. P. Stevens Glass Fabrics, Slater, NC. This material has about 60 volume percent E-glass fibers in a polymeric matrix such as, for example, an epoxy or cyanate ester, but the polymeric matrix is not limited to this material. The fiberglass insulator layer 36 is preferably from about 0.003 inch to about 0.005 inch thick. Its thickness is desirably small, to reduce the thermal impedance offered by the insulator layer 36. Such small, well-controlled thicknesses of the insulator layer can be achieved using the fiberglass material.

There is preferably no adhesive between the electrical insulator layer 36 and the wall of the battery cell housing 24, separate from the material of the insulator layer. Adhesive layers are typically about 0.007-0.015 inches in thickness. Such a thicker adhesive layer would add weight and also act as a thermal impedance to the removal of heat from the cylindrical surface 28 of the battery cell housing 24 of the battery cell 22. The structure and method of fabrication of the housing support 26 avoid the need for such an adhesive.

A heat-conductor layer 42 overlies and contacts the electrical insulator layer 36. The heat-conductor layer 42 comprises heat-conducting fibers 44 oriented generally parallel to the cylindrical axis 30. The heat conducting fibers 44 may be oriented away from the cylindrical axis 30 by about 10 degrees or more, yet still accomplish their heat-conducting function satisfactorily. The heat-conducting fibers 44 are preferably made of a high-thermal-conductivity graphite material of the type known in the art. As used herein, such a high-thermal-conductivity fiber must have a thermal conductivity of greater than about 160 Watts/meter-°K. This definition is selected because the thermal conductivity of the high-thermal conductivity fiber is to be greater than that of conventional aluminum alloys used in aerospace applications, which is typically about 160 Watts/meter-°K. Such a high-thermal-conductivity graphite material is commercially available as XN70A material from Nippon Graphite or P100 material from Amoco. The thermal conductivity of such fibers is about 193 Watts/meter-°K., well above that of aluminum alloys. The fibers 44 are embedded in a polymeric matrix 46, such as, for example, epoxy, but the polymeric matrix is not limited to this material. The fibers 44 are preferably present in as high a volume fraction of the heat-conductor layer 42 as possible, in order to achieve a high thermal flow through the layer. In a preferred embodiment, the fibers 44 are present in a volume fraction of 60 volume percent of the layer 42, but 70 volume percent of fibers is possible in some cases. The heat-conductor layer 42 is preferably a minimum of 0.040 inches thick, but can be thicker as desired. Excessive thicknesses add unnecessary weight. As a practical matter, a preferred maximum thickness of the heat-conductor layer 42 is about 0.060 inches.

A structural support layer 48 overlies and contacts the heat-conductor layer 42. The structural support layer 48 is a composite material, preferably comprising structural fibers 50 embedded in a polymeric matrix 52. The structural fibers 50 are preferably, but not necessarily, made of a high-strength graphite material. (The structural fibers 50 can be the same material as the heat-conducting fibers 44, if they are both strong and of high thermal conductivity.) Such a high-strength graphite material is commercially available as M40J fiber from Toray of Tokyo, Japan or IM7 fiber from Hercules. The polymeric matrix 52 is preferably epoxy, but the polymeric matrix is not limited to this material. The volume fraction of the fibers 50 in the matrix 52 is selected to produce mechanical properties desired for the particular battery system. In a presently preferred approach, the fibers 50 are present in the matrix 52 in an amount of about 60 volume percent. The structural support layer 48 is preferably a minimum of 0.030 inches thick, but can be thicker as desired. Increasing thicknesses add unnecessary weight. As a practical matter, a preferred maximum thickness of the structural support layer 48 is about 0.100 inches.

The structural fibers 50 are illustrated in FIGS. 3 and 4 as extending generally parallel to the circumferential direction 31 so as to provide a high hoop strength to the structural support layer 48, the preferred approach. The structural fibers 50 may also be oriented at an angle intermediate between the circumferential direction 31 and the axial direction 30, such as 45 degrees to the cylindrical axis 30, as required to produce selected stiffness and strength properties for the housing support 26. In a preferred manufacturing approach, the structural fibers 50 are applied by filament winding, so that they are oriented intermediate between the circumferential direction 31 and the axial direction 30. The structural fibers 50 thus restrain the hoop deformation (i.e., the deformation parallel to the circumferential direction 31) experienced in the battery cell housing 24 when it is internally pressurized during charging of the battery cell. Because the support housing 26 restrains the hoop deformation of the battery cell housing 24, the battery cell housing 24 may be made of thinner gauge metal and thence lighter than it would otherwise be manufactured, a highly significant advantage achieved by the present invention.

The heat-conducting fibers 44 of the- heat-conductor inner layer 42 conduct heat from the wall of the battery cell housing 24 and parallel to the cylindrical axis 30, as indicated by heat flow arrows 54 in FIG. 4. The heat flows toward a sink end 55 of the heat-conducting fibers 44, which are joined to a thermal sink 56 that is preferably located at one end of the cylindrical housing 24 and the housing support 26. The thermal sink 56 has a radiating surface 57 on the side remote from the heat-conducting fibers 44, so that heat flowing to the thermal sink 56 is radiated away into space, as indicated by the radiation arrows 58. Preferably, a metallic layer 59 is positioned on the thermal sink 56 at its radiating surface 57, to serve as a portion of the Faraday shield surrounding the battery cells and other spacecraft components.

The thermal sink 56 may be made of any suitable material. It is preferably made of a fiber-composite material of the same type as the structural support outer layer 48, although it could be made of other types of fiber-composite material such as the fiber-composite material of the heat-conductor layer 42. The sink end 55 of the heat-conducting fibers 44 is generously faired and joined to the thermal sink 56 by any appropriate technique which has a relatively low thermal impedance. The preferred approach is a thermal shim 53 made of a high-thermal-conductivity material. The preferred approach is a thermal shim 53 made of a high-thermal-conductivity, low-electrical-conductivity material. The preferred thermal shim 53 is made of a fiber-reinforced elastomer termed CHO-THERM manufactured by Chomerics, Inc. If only high thermal conductivity (but not low electrical conductivity) is required, the thermal shim 53 may be made of grafoil GTA graphite-containing composite material, available from Union Carbide, Cleveland, Ohio, but it could be made of other materials such as copper or aluminum. Bolts (not shown) hold the heat-conductor layer 42 and the structural support outer layer 48 to the thermal sink 56, with the thermal shim 53 therebetween.

A structural base 60 is positioned at an opposite end of the battery cell 22 and housing support 26 from the thermal sink 56. The structural support layer 48 is joined to the structural base 60. The structural base 60 may be made of any operable material, but it is preferably made of a composite material, such as the composite material of the structural support layer 48, in order to achieve high strength and low weight. The structural support layer 48 is joined to the structural base 60 by any operable approach, preferably bolts (not shown).

The structural base 60 is a structural component designed primarily to carry the weight, torsional, and vibrational forces of the battery system 20. The thermal sink 56, on the other hand, is designed primarily to conduct and radiate heat away. Nevertheless, the structural base 60 may serve to dissipate some heat, and the thermal sink 56 may carry a structural load such as a shear loading. Accordingly, the heat-conductor layer 42 is faired into and attached to the structural base 60 or to the side of the structural support layer 48 remote from the structural base 60 (as shown in FIG. 4). Similarly, the structural support layer 48 is faired into and bonded to the same side of the thermal sink 56 to which the heat-conductor layer 42 is bonded.

The relative degrees of thermal conduction and load transfer into the structural base and into the thermal sink may be selectively established during manufacture by varying the nature of the end bonding of the layers in the manner illustrated in FIG. 4. For example, the approach illustrated at the right side of FIG. 4 transfers more load and less heat into the structural base 60, because the mode of bonding of the structural support layer 48 partially insulates the heat-conductor inner layer 42 from the structural base 60. The approach illustrated at the left side of FIG. 4 transfers less load and more heat into the thermal sink 56, because the heat-conductor inner layer 42 extends to the thermal sink 56 and there is a relatively small shear area where the structural support layer 48 bonds to the thermal sink 56. The specific geometry of these bonded connections may be varied to control the relative heat flow and structural loadings transferred into the structural base and the thermal sink, providing the spacecraft designer with great flexibility in design selection.

By separating the functions of the heat-conductor layer 42 and the structural support layer 48, these layers may be separately optimized. In some prior composite supports for batteries, the heat conduction and structural support functions were combined in a single element, and the design of that element represented a compromise between structural strength and heat conduction. In the present approach, no such compromise is required and the functions of the layers 42 and 48 are separately optimized.

The structural base 60 and thermal sink 56 are illustrated in FIGS. 1-4 for use with a single battery cell 22. However, as shown in FIG. 5, in many applications multiple battery cells 22 are supported between a single structural base and a single thermal sink. In the battery pack 62 of FIG. 5, eight battery cells 22 and their respective housing supports 26 extend between the structural base 60 and the thermal sink 56. The structure of the elements and their attachments are as described previously in relation to FIGS. 1-4.

The eight battery cells 22 and their respective housing supports 26 serve as nearly rigid structural elements interconnecting the structural base 60 and the thermal sink 56 of the battery pack 62. The battery cells 22 and their housing supports 26 provide deformation resistance in the axial direction 30. Inasmuch as they are laterally displaced from each other in two dimensions, they also impart shear strength to the battery pack 62. For some applications, separate structural members performing the interconnection of the structural base and the thermal sink and providing shear resistance of the structure are not required, so that the battery pack weight is substantially lower than would otherwise be the case. The side walls 64 provided on the lateral sides of the battery pack 62 serve primarily as curtains to exclude debris from the interior of the battery pack 62 rather than as structural elements. In other applications, the side walls do perform structural functions and may have reinforcing members such as cross straps mounted thereon. The side walls or the ends of the battery pack may be used to mount auxiliary equipment such as switches, relays, wiring, sensors, etc.

FIG. 6 illustrates a preferred method for fabricating the battery system of the invention. The battery cell 22 is prepared using known techniques and furnished, numeral 70. The electrical insulator layer 36 is applied over the cylindrical surface 28 of the housing 24, numeral 72, after first cleaning the surface 28 with a solvent such as methyl ethyl ketone. The fiberglass material is applied by wrapping or layup in a wet, uncured form.

No separate adhesive is used to bond the electrical-insulator layer 36 to the housing 24 in this preferred embodiment.

The heat-conductor-layer 42 is applied over the electrical insulator layer 36, numeral 74. Because the primary function of the layer 42 is to conduct heat from the housing 24 and along the length of the fibers 44 to the thermal sink 56, the fibers 44 are oriented as closely as possible to be parallel to the cylindrical axis 30, but they may be 10 degrees or more from the cylindrical axis. However, the fibers 44 need not be aligned perfectly with the cylindrical axis, and deviations are permitted. The high-thermal-conductivity graphite fibers and polymeric matrix are preferably applied by layup or filament winding in a wet, uncured form. To define the shape of the housing support 26 at the domed ends of the battery cell 22, a female mold having the desired final internal shape of the heat-conductor layer 42 is first prepared. This mold leaves a space at the ends of the battery cell 22 to allow access to the ends. The space is filled with plaster. After the plaster solidifies, the female mold is removed and the composite material of the heat-conductor layer 42 is wound over the cylindrical surface 28 and the plaster.

The structural support layer 48 is applied over the heat-conductor layer 42, numeral 76. The primary function of the layer 48 is to support the hoop stress of the battery cell housing 24 and to transfer the loadings imposed on the battery cell 22 to the structural base 60. The structural support layer 48 is therefore designed with fiber-orientations that are optimized from a structural standpoint. This optimization and the details of the fiber orientations in the layer 48 are specific to a particular battery cell design. Generally, however, the fibers are positioned to have a substantial component parallel to the circumferential direction 31 to provide hoop strength, but also a component that is not parallel to the circumferential direction. Crossed plies oriented at ±45 degrees to the cylindrical axis 30 are typically used to form the layer 48 in order to achieve balanced loadings. The layer 42 may be applied either by a filament winding technique or a wet layup technique.

The structure of the electrical insulator layer 36, the heat-conductor layer 42, and structural support layer 48 is cured onto the battery cell housing 24, numeral 78. In the preferred approach, the curing is accomplished at ambient temperature in a time of at least 8 hours. The matrices of the layers 36, 42, and 48 are selected to be compatible for a common curing procedure, and this selection is reflected in the preferred materials of construction discussed previously herein. In the curing operation, the layer 36 bonds to the housing 24, the layer 42 bonds to the layer 36, and the layer 48 bonds to the layer 42. The cured structure is machined as necessary for the subsequent assembly steps, numeral 80. In this machining operation, windows are cut through the layers 36, 42, and 48 and the plaster mold material is removed.

The steps 70, 72, 74, 76, 78, and 80 are performed for each of the battery cells 22 and housing supports 26, where, as in the embodiment of FIG. 5, a multi-cell battery pack is manufactured.

The thermal sink 56 is supplied and affixed to the heat-conductor layer, numeral 82. The structural base 60 is supplied and affixed to the structural support layer 48, numeral 84.

The order of the steps 78, 80, 82, and 84 may be altered according to the details of the construction of the battery system. In some cases, as illustrated, the thermal sink and structural base are attached after curing. In other cases, for example, one or both of the thermal sink and structural base may be attached before curing.

A single structural support has been successfully fabricated using the approach described herein in steps 70, 72, 74, 76, 78, and 80, with a flight-type nickel-hydrogen cell having a diameter of about 5½ inches and a length of about 14 inches. Based upon this fabrication, it is estimated that the approach of the invention will reduce the weight of the battery pack of a spacecraft by about 82 pounds.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A battery system, comprising:
   a battery cell having a battery cell housing;
   a housing support external to the battery cell housing, the housing support comprising
   an electrical insulator layer contacting an external surface of the battery cell housing with no adhesive between the external surface of the battery cell housing and the electrical insulator layer,
   a heat conductor comprising a plurality of heat-conducting fibers contacting the electrical insulator layer, each of the heat-conducting fibers having a sink end thereof, and
   a structural support layer overlying the plurality of heat-conducting fibers, the structural support layer being made of a fiber-reinforced composite material; and
   a thermal sink in thermal contact with the sink ends of the plurality of heat-conducting fibers.

2. The battery system of claim 1, further including
   a structural base to which the structural support layer is joined.

3. The battery system of claim 1, wherein the electrical insulator layer comprises a layer of fiberglass.

4. The battery system of claim 1, wherein the heat-conducting fibers are made of high-thermal-conductivity graphite.

5. The battery system of claim 1, wherein the structural support layer comprises a layer of a graphite-fiber-reinforced nonmetallic matrix.

6. The battery system of claim 1, wherein the battery cell housing is generally cylindrical with a cylindrical axis, wherein the heat-conducting fibers are oriented parallel to the cylindrical axis, and wherein the thermal sink is located at a first end of the cylindrical battery cell housing.

7. The battery system of claim 6, further including a structural base to which the structural support layer is joined, the structural base being disposed at a second end of the cylindrical battery cell housing.

8. A battery system, comprising:
   a battery cell having a generally cylindrical battery cell housing with a cylindrical axis and a cylindrical external surface;
   a housing support external to the cylindrical external surface of the battery cell housing, the housing support comprising
   an electrical insulator layer contacting the cylindrical external surface of the battery cell housing,
   a heat conductor comprising a plurality of heat-conducting fibers overlying and contacting the electrical insulator layer and aligned generally parallel to the cylindrical axis of the housing, each of the heat-conducting fibers being made of high-thermal-conductivity graphite and having a sink end thereof, and
   a structural support layer overlying the plurality of heat-conducting fibers and forcing the electrical insulator layer into contact with the battery cell housing without the presence of an adhesive between the electrical insulator and the housing, the structural support layer being made of a fiber-reinforced composite material; and
   a thermal sink in thermal contact with the sink ends of the plurality of heat-conducting fibers, the thermal sink being disposed at a first end of the battery cell housing.

9. The battery system of claim 8, wherein the electrical insulator layer comprises a layer of fiberglass.

10. The battery system of claim 8, wherein the thermal sink comprises a graphite radiator.

11. The battery system of claim 8, wherein the structural support layer comprises a graphite-fiber-reinforced polymeric matrix.

12. The battery system of claim 8, further including
   a structural base to which the structural support layer is joined, the structural base being disposed at a second end of the battery cell housing.

13. A battery system, comprising:

a plurality of battery cells, each of the battery cells having a battery cell housing;

a respective housing support external to and overlying each battery cell housing, each housing support comprising
- an electrical insulator layer contacting an external surface of the respective battery cell housing with no adhesive between the external surface of the respective battery cell housing and the electrical insulator layer,
- a heat conductor comprising a plurality of heat-conducting fibers contacting the electrical insulator layer, each of the heat-conducting fibers having a sink end thereof, and
- a structural support layer overlying the plurality of heat-conducting fibers, the structural support layer being made of a fiber-reinforced composite material;

a thermal sink in thermal contact with the sink ends of the plurality of heat-conducting fibers of each of the housing supports; and a structural base to which the structural support outer layer of each of the housing supports is joined.

14. The battery system of claim 13, wherein the heat-conducting fibers are made of high-thermal-conductivity graphite.

15. The battery system of claim 13, wherein the structural support layer comprises a layer of a graphite-fiber-reinforced nonmetallic matrix.

16. The battery system of claim 13, wherein each battery cell housing is generally cylindrical with a cylindrical axis, wherein the heat-conducting fibers are oriented substantially parallel to the cylindrical axis, and wherein the thermal sink is located at a first end of each battery cell housing.

17. The battery system of claim 14, wherein the structural base is disposed at a second end of each battery cell housing.

18. A method for preparing a battery system, comprising the steps of furnishing a battery cell having a generally cylindrical battery cell housing with a cylindrical axis and a cylindrical external surface;

applying an electrical insulator layer contacting and overlying the cylindrical external surface of the battery cell housing;

applying a heat-conductor layer overlying and in contact with the electrical insulator layer, the heat-conductor layer comprising a plurality of heat-conducting fibers aligned generally parallel to the cylindrical axis of the battery cell housing, each of the heat-conducting fibers being made of high-thermal-conductivity graphite and having a sink end thereof;

applying a structural support layer overlying the plurality of heat-conducting fibers and forcing the electrical insulator layer into contact with the battery cell housing without the presence of an adhesive between the electrical insulator and the battery cell housing, to form a pre-curing assembly, the structural support layer being made of a fiber-reinforced composite material; and affixing the sink ends of the heat-conducting fibers to a thermal sink, the thermal sink being disposed at a first end of the battery cell housing.

19. The method of claim 18, wherein the step of applying a structural support layer includes the step of winding the fiber-reinforced composite material overlying the plurality of heat-conducting fibers.

20. The method of claim 18, wherein the step of applying a structural support layer includes the step of laying up the fiber-reinforced composite material overlying the plurality of heat-conducting fibers.

* * * * *